April 29, 1924.  
D. J. CAMPBELL  
MOLDING MACHINE  
Filed Feb. 10, 1921  
1,492,353  
5 Sheets-Sheet 4

Fig. 6.

INVENTOR  
DONALD J. CAMPBELL  
By Frank E. Liverance Jr.  
ATTORNEY.

April 29, 1924.

D. J. CAMPBELL

MOLDING MACHINE

Filed Feb. 10, 1921

INVENTOR
DONALD J. CAMPBELL
By Frank E. Liverance, Jr.
ATTORNEY.

Patented Apr. 29, 1924.

1,492,353

UNITED STATES PATENT OFFICE.

DONALD J. CAMPBELL, OF MUSKEGON HEIGHTS, MICHIGAN.

MOLDING MACHINE.

Application filed February 10, 1921. Serial No. 443,739.

*To all whom it may concern:*

Be it known that I, DONALD J. CAMPBELL, a citizen of the United States of America, residing at Muskegon Heights, in the county of Muskegon and State of Michigan, have invented certain new and useful Improvements in Molding Machines; and I do hereby declare the following to be a full, clear, and exact description of the invention, such as will enable others skilled in the art to which it appertains to make and use the same.

This invention relates to molding machines, being particularly concerned with machines for the formation of moulds for casting which are to be made from green sand and pressed to proper density by the force of compressed air. It is a primary object and purpose of the invention to make a machine with which quantity production of moulds of the same kind may be had, the machine being capable of working at high speed for mould production, the design being that at least one complete mould part shall be produced each minute of operation. A further object of the invention is to provide a machine of simple construction and one readily and easily worked for the quantity production of moulds. A still further object of the invention is to provide the machine with novel elements, a number of which in themselves are capable of operation outside of the machine and in other relations, but which when working together in the relation designed are productive of quick and economical results in mould making. All of these features, together with many others not at this time particularly enumerated will appear fully and in detail as understanding of the invention is had from the following description, taken in connection with the accompanying drawings, in which.

Like reference characters refer to like parts in the several figures of the drawings.

In the construction of the machine, a base 1 is used from which posts 2, 3 and 4, extend upwardly, being firmly secured at their lower ends to said base. Posts 2 and 3 are located at what may be termed the front side of the machine, and post 4 is directly back of the post 3. The upper end portions of the posts are connected together by a strong casting having arms 5 and 6 located at right angles to each other, the arm 5 extending between the front posts 2 and 3, and the arm 6 between the post 3 and the rear post 4. Nuts 7 are threaded on to the posts two on each post, one above and the other below the casting, it being evident that the casting may be raised or lowered a limited amount.

Figure 6:
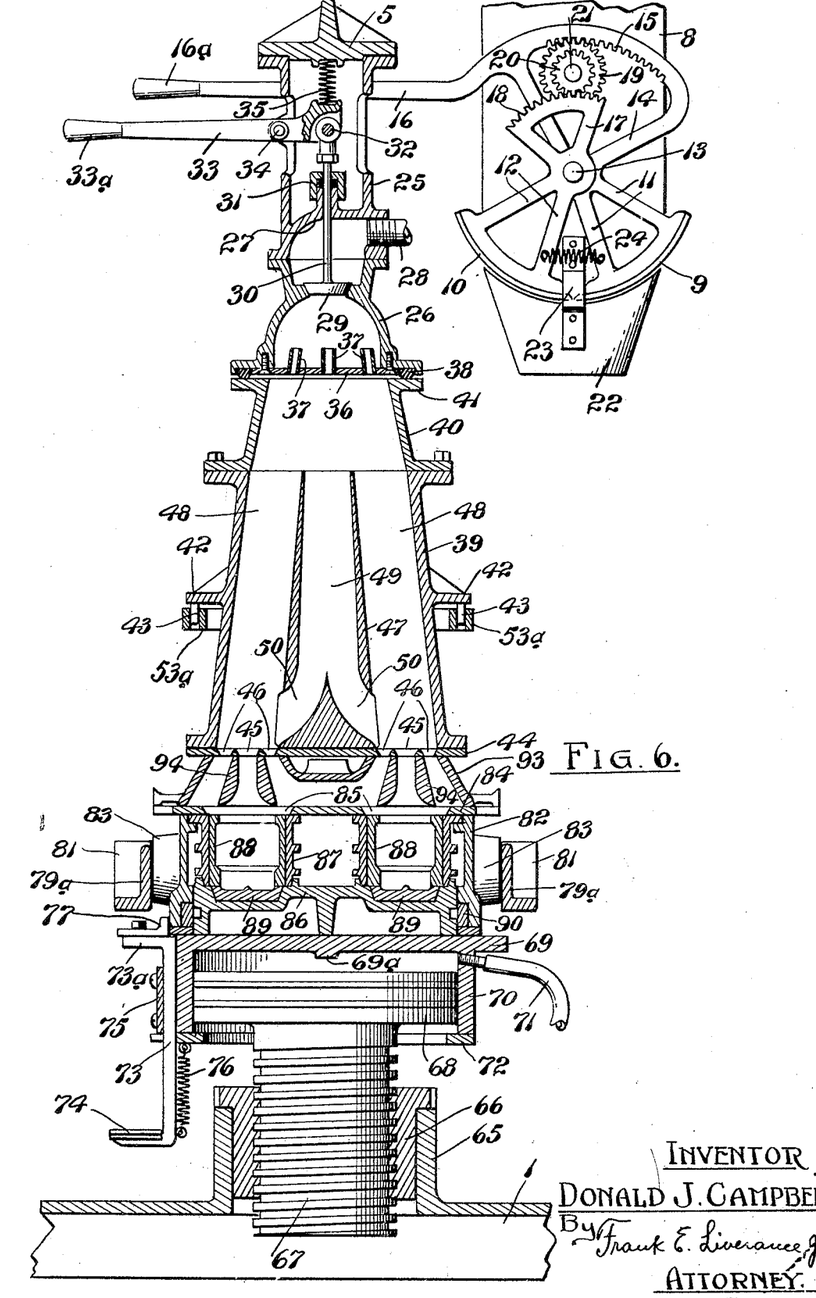
Fig. 6 is an enlarged vertical section substantially on the plane of line 6—6, of Fig. 1.
Figure 7:
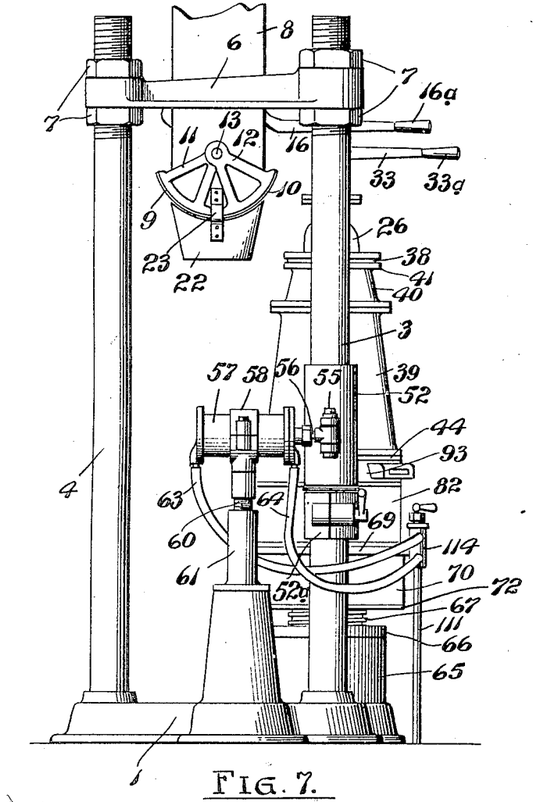
Fig. 7 is an elevation of the machine looking at the same from the left of Fig. 3.

A sand chute 8 is located vertically back of the arm 5, and if desired, may be connected thereto. The lower end of the chute is normally closed by two curved gates 9 and 10 from which radial arms 11 and 12 extend to a common pivot 13 on each side of the chute. On one side the member containing the arms 11 is extended above the pivot, as indicated at 14, and connected by an arc shaped upper member on the under edge of which a plurality of gear teeth 15 are cut. An operating handle 16 extends therefrom, terminating at its end in a hand hold 16ª. The member having the arms 12 on the same side of the chute is also extended beyond the pivot 13 as indicated at 17 and also has an arc shaped upper side, the upper edge of which is provided with gear teeth 18. Two pinions 19 and 20, of different sizes, but connected together side by side are mounted on a stud shaft 21, the pinion 19 having engagement with the teeth 15 and pinion 20 with the teeth 18. Below the gates 9 and 10 and in alinement with the lower end of chute 8, a funnel shaped guide 22 is located, the same being suspended from the chute by straps 23. The gate members 9 and 10 are normally brought together to close the lower end of the chute by a spring 24 connecting the adjacent arms 12 and 11 as shown in Fig. 6.

A sleeve casting 25 is attached at its upper end to the under side of the arm 5, depending therefrom and having connection at its lower end to a valve casing 26. A web 27 is located within and across the member 25 and compressed air is carried to the space below said valve through an inlet pipe 28. A valve 29 normally closed a passage in the valve casing to prevent the escape of the air except as desired. Valve 29 is attached at the lower end of a valve rod 30 which extends upwardly through web 27 and a stuffing box 31 associated therewith and has pivotal connection at 32 at its upper end with the inner end of a lever 33 pivotally mounted between its ends at 34 on the sleeve casting 25. The lever 33 extends outwardly through the sleeve and terminates in a handle 33ª. A spring 35 is disposed between the under side of arm 5 and the upper side of the inner end of lever 33, helping to keep the valve 29 closed. The valve casing 26 at its lower end is closed by a plate 36 in which a plurality of outlet tubes are set at different angles to the vertical as indicated at 37, and a rubber gasket ring 38 is attached to the outwardly extending lower flange of the valve casing around the plate 36, it projecting a short distance below the lower sides of the plate and flange.

Figure 4:
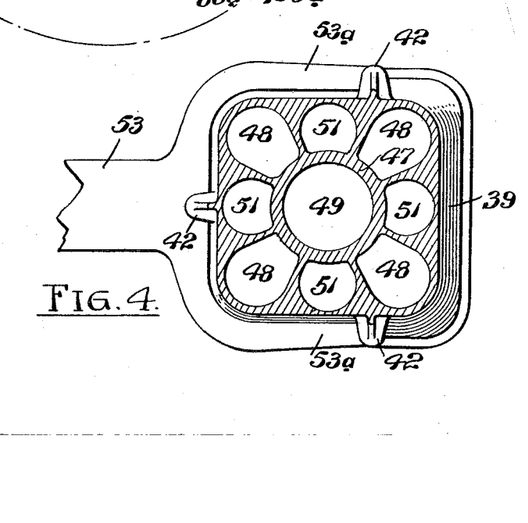
Fig. 4 is a horizontal section through the sand hopper, on the plane of line 4—4 of Fig. 1.
Figure 5:
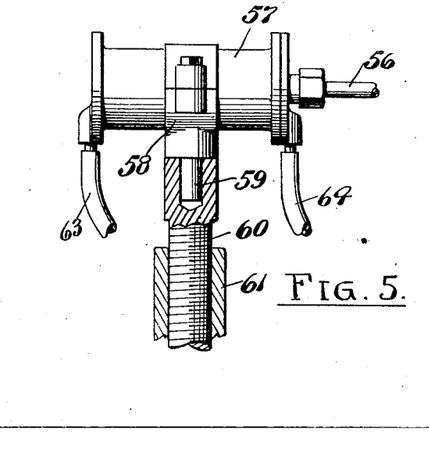
Fig. 5 is a fragmentary elevation of the air cylinder mechanism for moving the sand hopper.

A sand hopper comprised of a lower and upper section 39 and 40, respectively is adapted to be moved to a position directly under the valve casing 26, the upper section being provided with an upper out-turned flange 41 of substantially the same size as the valve casing. A number of lugs 42 from each of which a pin 43 depends are cast in spaced apart relation on and project from the hopper section 39. The lower end of the lower section is closed by a plate 44 in which at a number of points openings 45 and 46 are made to correspond with the sand guide plate below, as will be later described. The interior of the lower section 39 of the hopper is divided by partitions 47 to make a plurality of substantially vertical passages 48, one at each corner of the hopper section 39, a central passage 49 from which branches 50 extend into the first passages 48 at their lower ends, and a number of additional passages 51 positioned between the corner main passages 48 and designed to connect at their lower ends with the passages 48 at each side. Fig. 4 best shows the position of the various passages with respect to each other.

A sleeve 52 is rotatably mounted on the post 3, bearing on a collar 52ª adjustably secured to the post. An arm 53 extends from the sleeve toward the hopper, the same being forked so as to provide arms 53ª, passing one to each side of the lower section 39 of the hopper. The pins 43 enter suitable openings made in said arms 53ª and the end of the arm 53, as shown. A second arm 54 extends from sleeve 52 in the opposite direction and is connected pivotally at 55 to the outer end of a piston rod 56 entering an air cylinder 57, the same being clamped in a surrounding collar 58 from which a pin 59 extends downwardly into a suitable socket opening made in the upper end of a short post 60 threaded into the upper end of a supporting post 61 therefor, the same being cast with the base 1. Air hose connections 63 and 64 are made with opposite ends of the cylinder 57 for carrying air to opposite sides of the piston therein, the control of which will later appear. It is apparent that by operation of the rod 56, the sand hopper may be swung back and forth, so as to come directly under the end of the guide 22 to receive a charge of sand, and then moved to a point directly under the valve casing 26, or as shown in Fig. 6.

A supporting flange 65 is cast with the base 1 under and in vertical alinement with the sand hopper when it is under the valve casing, in which a heavy nut 66 is positioned, the same being interiorly threaded for the reception of a threaded post 67 to the upper end of which a piston head 68 is secured. A cylinder having an upper side or table 69 and depending sides 70 is placed over the piston, the piston being provided with rings to prevent the escape of air by the same. Air under pressure is carried into the cylinder through a hose 71 to a point above the piston, and in practice, the table 69 is formed on its under side with a downwardly projecting lug 69ª which insures that a space will always be left between the piston and table for the air entrance.

At the front side of the cylinder a bar 73 formed at its lower end with a foot member 74 is slidably mounted for vertical movements in a suitable guide 75, the bar being normally impelled in an upward direction by spring 76. The upper end of the bar is turned outwardly, as indicated at 73ª and to the same a stop member 77 is attached which in normal upper position projects above the upper side of the table 69.

Two sleeves 78 and 78ª are rotatably mounted one over the other on post 2. Arms 79 and 80 project from said sleeves, each at its outer end being forked to make fork arms 79ª and 80ª, respectively. A core box mould, including an outer housing 82 from which trunnions 83 project outwardly at opposite sides is located between each of the fork arms, the trunnions seating in suitable sockets 81 made at the ends of the fork arms whereby the core box mould as a whole may be turned over. An upper cover plate 84 with openings 85 therein covers the housing 82 and a movable base plate 86 is located in the lower part of the housing, master boxes 87 within which core side forms 88 are secured being located between the upper and base plates, while the lower end forms for the cores, indicated at 89 are attached to the base plate. The base plate is designed to have vertical movements through connection with a movable ring 90 manually operable by a handle 91 connected thereto, and the master boxes with side core forms attached thereto are designed to be separated by manual operation of the crank 92. The specific construction for accomplishing this is the subject matter of a separate application having Ser. No. 443,738, filed Feb. 10, 1921 and need not be further outlined here.

Figure 8:
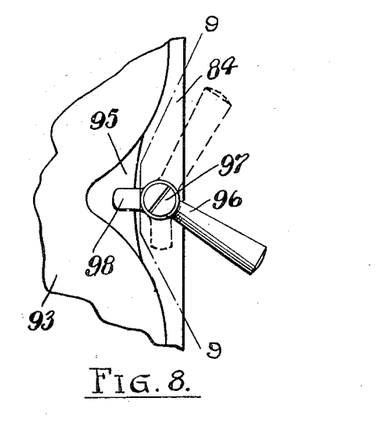
Fig. 8 is a fragmentary plan showing the means used for clamping the core box cover plate to the core box.
Figure 9:
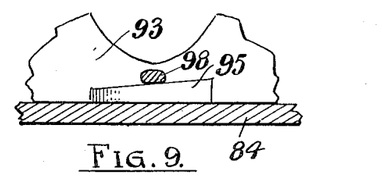
Fig. 9 is a fragmentary section on the line 9—9, of Fig. 8.
Figure 10:
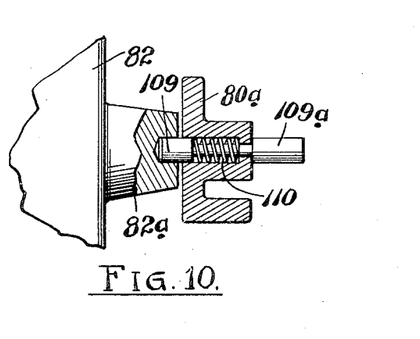
Fig. 10 is a fragmentary section showing the means used for releasably holding the core box from rotative movement.

A sand guide and directing plate 93 is placed above the core box mould, the same having a plurality of said guide and directing members 94 therein for properly guiding and directing sand under air pressure into the core box mould. The specific structure of the plate is also a subject matter of a separate application for patent Ser. No. 454,192, filed March 21, 1921. This plate 93 is designed to be detachably secured to the core box, at opposite sides being formed with webs 95 having an upper face inclined to the horizontal. A handle 96 is pivotally mounted at 97 at each side of the core box and has an inwardly extending finger 98 which may be moved to ride against the inclined cam-like upper side of the web 95, to firmly clamp the plate in place. Turning the handle and connected finger 98 to the dotted line position shown in Fig. 8 serves to free the plate for removal from the box as is obvious.

A third sleeve 99 is mounted on the post 2 below the other sleeves 78 and 78$^a$, and is adapted to be clamped against movement with respect to the post. An outwardly extending arm 100 is made integral with sleeve 99 and at its outer end is equipped with a sleeve 101 in which a post 102 is mounted for vertical movements, the same being operated up and down by manipulation of a handle 103 carrying a latch 104 adapted to engage with a ratchet 104$^a$ as shown. The upper end of the post is provided with a housing 105 and includes mechanism for releasably clamping a short post 106, equipped with a table 107 at its upper end against movement. The specific construction of this mechanism is outlined also in a separate application for patent Serial No. 443,740, filed Feb. 10, 1921, only the operating handle 108 therefor showing in the drawing. It is designed that the core boxes when filled with sand are to be swung to the table 107 which is then elevated against the under side of said core box which has been turned over from the position shown in Fig. 6, so that the plate 93 comes against the table 107, and in order to have the core boxes firm against movement with respect to the supporting fork arms therefor during this operation and others, yet capable of turning at times when desired, a latch pin 109, spring actuated by a spring 110 is mounted on one of the arms 79$^a$ and 80$^a$ for engagement in suitable sockets 82$^a$ made on the housings 82, two of the sockets being used with each housing so that the core boxes may be held horizontal either when in the position shown in Fig. 6, or when turned one hundred and eighty degrees from such position.

The compressed air for operating the rod 56 and for lifting table 69 may be carried through a pipe 111 which has a T 112 at its upper end from which branches lead to two valve constructions 113 and 114, the former having the hose 71 connected therewith, and the latter being a compound valve from which the two hose lines 63 and 64 lead to the cylinder 57. By turning the valve at 113, the air may be entered to elevate table 69, and by turning that at 114 to different positions, the air may be carried to different ends of the cylinder, and the swinging back and forth of the sand hopper controlled.

In the operation of the machine, a core box mould carried by one of the swinging arms 79 or 80 is brought to and above the table 69 with a plate 93 attached thereto at its upper side, it being stopped when in proper position over the table by engagement with the stop member 77. By proper operation of the valve at 114, the sand hopper is swung so as to come directly under the sand chute, the lower end of the member 22 lying directly over the open upper end of the upper section 40 of the hopper. The handle 16 is then grasped and pulled downwardly with the result that both gates 9 and 10 swing outwardly away from each other and allow the sand in the chute to pass directly into the hopper. It is evident that gate 9 is moved through direct connection with the handle 16 and gate 10 through the gearing connection described. When a sufficient amount of sand has been delivered to the hopper, the handle is released, the gates automatically clossing under the influence of spring 24. The sand delivered to the hopper is somewhat damp and has sufficient cohesive properties that it does not pass through the hopper at the lower end through the openings 45 and 46; and this is especially true after the first filling of the hopper has been accomplished as thereafter the lower part of the hopper is filled with sand at all times. The valve at 114 is then operated in the opposite direction, causing the hopper to be swung back to a position over the sand guide plate 93 and with the upper end of the hopper directly under the valve casing 26. Valve 113 is then opened and the air entered between the piston 68 and table 69, this forcing the table upwardly and bringing the flange 41 tightly against the gasket 38 and the upper side of the plate 93 against the under plate 44 of the hopper, so that a practically air tight joint is made both between the upper end of the hopper and the valve casing and the lower side of the hopper and the cover plate 93 for the core box mould. The first joint, particularly, is and needs to be tight, while the second is not so important. Handle 33 is then operated to lift the valve 29 to permit the compressed air to enter the lower portion of the valve casing, and therefrom pass through the short tubes 37 against the sand in the hopper, forcing the same downwardly through the passages 48, 49, and 51, through the openings 45 and 46 in the plate 44 directly under the lower ends of passages 48, and through and around the sand guide and directing members 94 and the openings 85 in the core box cover plate into the spaces bounded by the core forms 88 and 89. The short tubes 37 are disposed in alinement with the various passages 49, 48 and 51 and have the effect of aiming the compressed air against the sand so as to force it in the most direct and efficient manner to the core box. The sand may be given one or more impulses from the air as experience shall direct, and after it has done its work, the core box moulds and the openings and cavities in the plate 93 are completely filled with sand in proper density for moulds, requiring no further tamping or ramming.

Figure 1:
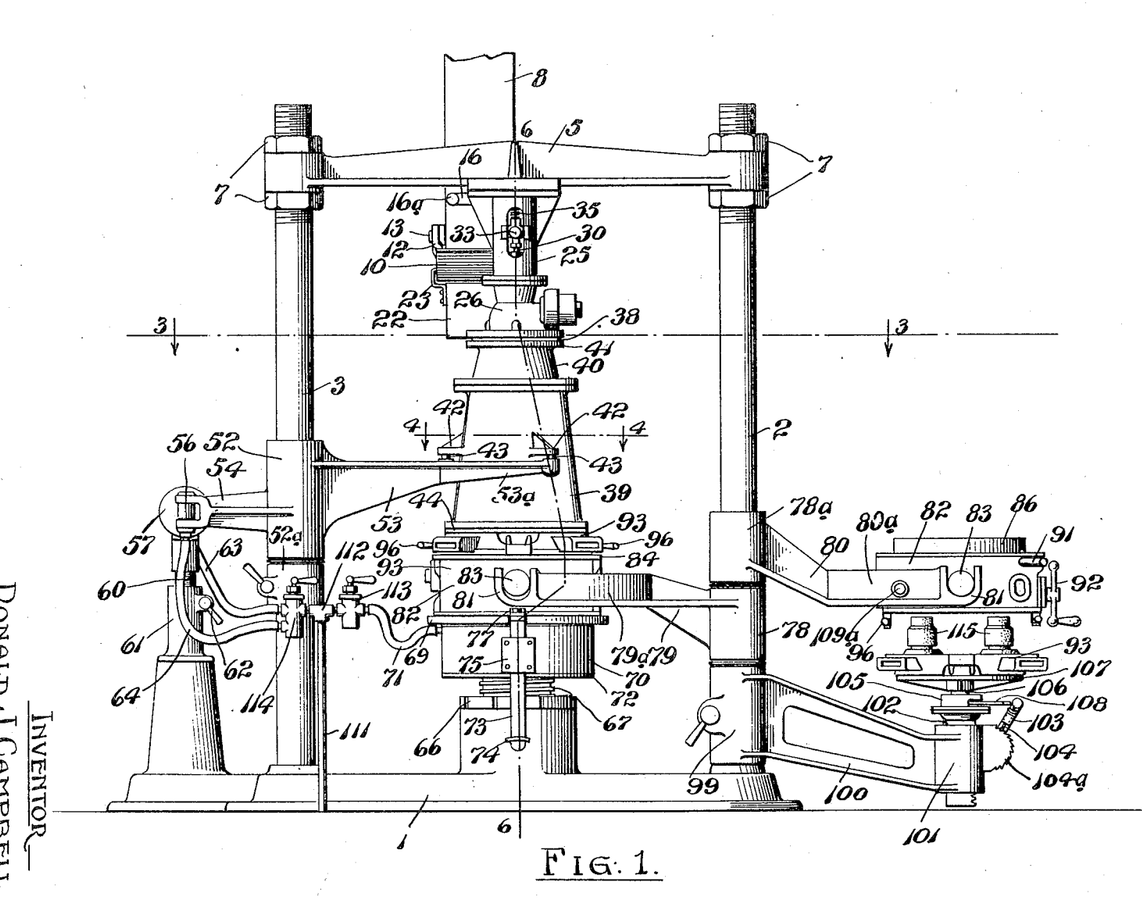
Fig. 1 is an elevation of the complete machine.
Figure 2:
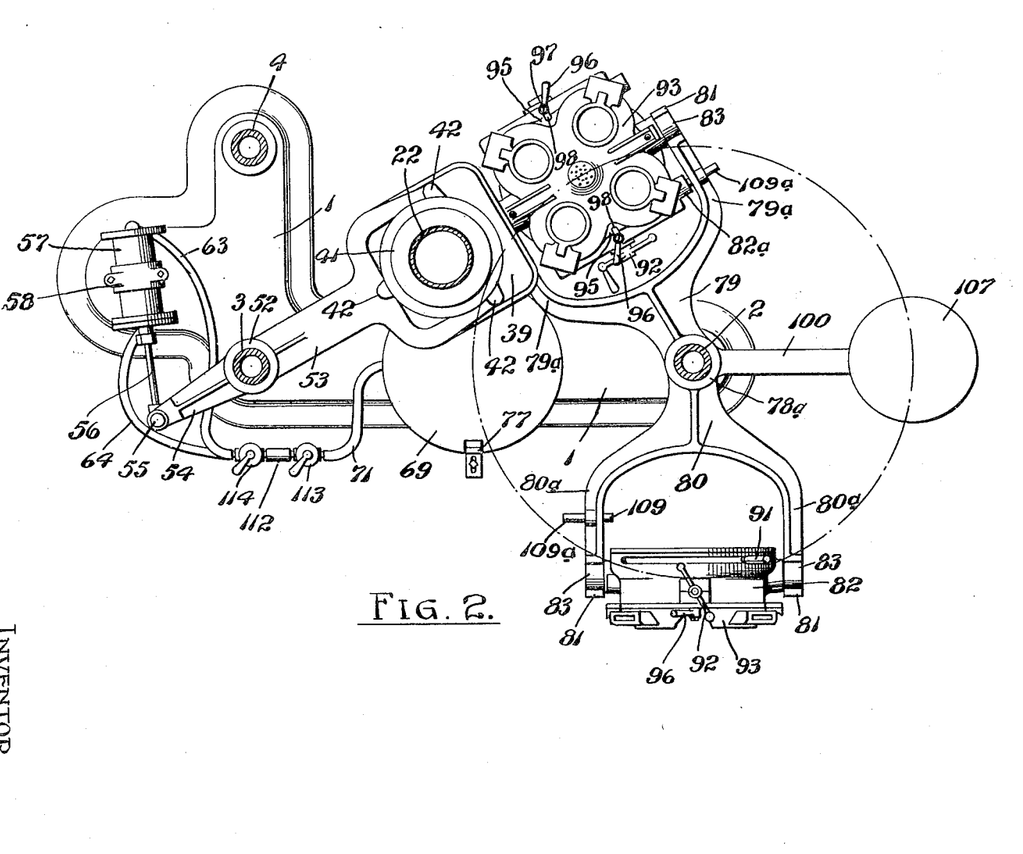
Fig. 2 is a horizontal section looking down from the plane of line 3—3, of Fig. 1, but with the parts of the machine in a different position than shown in Fig. 1.
Figure 3:
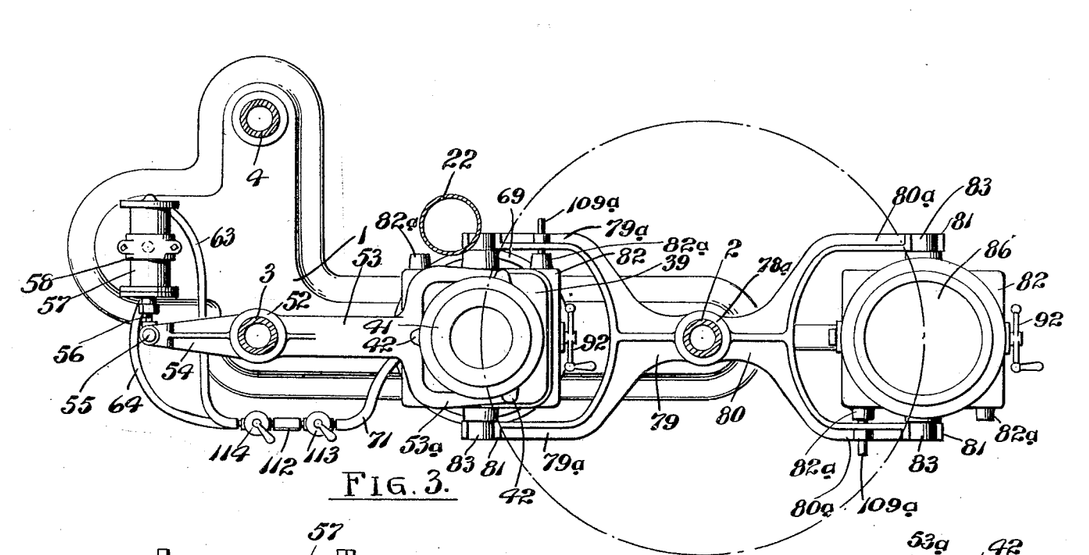
Fig. 3 is a similar section on the plane of line 3—3 of Fig. 1, looking downwardly, and with the parts in the same position as shown in Fig. 1.

Valve at 113 is now reversed allowing the pressure which clamped the different members together to release, the operator steps on the foot member 74 to depress the stop member 77 and the filled core box and attached plate 93 is swung about the axis of post 2 away from the table 69, the other core box being moved into its place. When partially swung to the table 107, the pin 109 is withdrawn and the core box and attached sand guide plate turned over, as indicated in Fig. 2, thereafter being brought directly above the table 107, again held in turned over horizontal position by the pin 109. The table is elevated against the under side of plate, conforming thereto, after which it is locked in fixed relation by operating lever 108, base plate 86 elevated by operation of handle 91 and the master boxes separated by turning crank 92, as fully set forth in the applications relating thereto, and then table 107 is lowered drawing the core moulds 115 and the plate 93 from the core box, the levers or handles 96 being first moved to allow disconnection of the plate 93 from the core box. The core box freed of the core moulds may be then carried away from the drawing mechanism, the core box turned over, a new plate 93 attached thereto and it is ready to again be carried to the table 69 for filling. In the meantime, the other core box has been filled, following the same process and is moved from the table 69 to the mould drawing mechanism for the taking of its moulds therefrom. The operation may be indefinitely repeated, or as long as additional plates 93 are available. Of course, each mould as completed and drawn from the core box on to table 107 is removed from said table and conveyed to another portion of the foundry to receive its cope, thereafter going to the proper place in the foundry for pouring the molten metal therein.

The machine described is practical and operative and with it a substantially continuous operation of mould forming may be had. The machine in operation requires the services of three men for the best results and when so operated, the formation of the moulds is very rapid, equalling one per minute. The construction is relatively simple in view of the work done, and all parts are freely accessible for repair. While I have illustrated the cores made as those for engine pistons, it is understood that the machine is not limited in any way to the formation of one particular kind of mould, requiring only different mould boxes and plates therefor for different patterns of moulds. The circular path of movement of the mould boxes with the different steps of the process of the molding at different succeeding points in the circumference of the circular path of movement of the boxes is a very valuable feature of the invention. The machine is durable and in every way serves the purposes for which it is designed. The appended claims define the invention and I consider myself entitled to all constructions coming within the scope thereof.

I claim:

1. In combination, a vertical support, an arm rotatably mounted on said support and extending therefrom, a mould box mounted at the outer end of said arm to turn about a horizontal axis, a table to which said mould box is carried and on which the same is located during the time said box is filled, a plate detachably connected to the upper side of the mould box through which the box is filled, a second table over which the mould box is swung after filling, and means to raise and lower said table, said mould box being turned over and the plate disconnected therefrom whereby on lowering the table the plate with moulds thereon are drawn from the box, substantially as described.

2. In combination, a supporting table, a mould box on the table, a sand guide plate detachably attached to the box at the upper side thereof, a sand hopper movable back and forth over the plate, means for moving said hopper, means to supply the hopper with sand when moved away from the plate, and means for forcing sand from the hopper through said plate into the mould box by force of compressed air applied to the sand in the hopper at the upper end of the hopper, substantially as described.

3. In combination, a supporting table, a mould box on the table, a sand guide plate connected to the box at the upper side thereof, a vertical support, a sand hopper mounted to swing about said support, means for moving the hopper a limited distance back and forth about said support, the same coming directly above the guide plate in one position thereof, means for supplying the hopper with sand at its upper end when away from the plate, and means for applying compressed air to and above the sand in the hopper when over said guide plate to thereby force the sand from the hopper through the plate and into the mould box, substantially as described.

4. In combination, a vertical support, a mould box mounted on the support to turn in a circular path about the support, a table on to which the box is carried for filling, a stop member located at one side of the table and normally projecting above the table to stop the mould box at a predetermined position with reference to the table, and means for moving the stop member to below the upper side of the table, substantially as described.

5. In combination, a vertical support, a mould box mounted on the support to turn in a circular path about the support, a table on to which the box is carried for filling, a bar slidably mounted and positioned vertically at the side of the table, said bar at its lower end having an out-turned foot engaging portion, spring means tending to elevate the bar, and a stop member attached to the upper end of the bar and normally projecting above the upper side of the table, being retracted below the said upper side of the table on downward movement of said bar, substantially as described.

6. In combination, a vertical post, a sleeve rotatably mounted thereon, an arm projecting from the sleeve, said arm being divided at its free end, a sand hopper carried by and between the divided ends of the arm, a second arm projecting from the sleeve in the opposite direction, an air cylinder, a piston rod connected to the end of the second arm and entering the cylinder, air inlet conduits leading to both ends of the cylinder, and manually operable valve means for controlling the passage of compressed air to either end of the cylinder, substantially as described.

7. In combination, a frame having an upper cross member, a valve casing suspended from said cross member, a table mounted a distance below the cross member and adapted to have a mould box with a sand guide cover plate attached thereto at its upper side located thereon, a sand hopper movably mounted and adapted to be moved between the lower end of the valve casing and the upper side of the sand guide plate, means for entering compressed air under the table to elevate the same and clamp the parts together, a valve in the valve casing normally stopping passage of compressed air from the valve casing into the sand hopper, and means for manually moving the valve to permit the passage of said air, substantially as described.

8. In combination, the elements in combination defined in claim 7, combined with a sand chute located to one side of the valve casing, means for moving the sand hopper to the lower end of the chute and back to in under the valve casing, and means normally closing the lower end of the chute but manually operable to open the lower end thereof to permit passage of sand from the chute to the hopper, substantially as described.

9. In combination, a vertical support, a table located at one side of the support, a second table located at the opposite side of the support, means for moving the second table up or down, two sleeves located one over the other on the support and rotatable about the same, an arm projecting from each sleeve, each of said arms being divided at its outer end, a mould box mounted for rotation on and between the divided portions of said arms, and mounted to turn about horizontal axes, each of said mould boxes lying in the same horizontal plane and movable over said tables, and means for filling the mould boxes with sand when over the first table, said mould boxes being swung through a circular path to the first table one after the other and moving therefrom to above the second table in succession for withdrawing of the moulds therefrom.

10. A construction containing the elements in combination defined in claim 9, combined with releasable means for holding the mould boxes in horizontal position when over the tables, but permitting their turning at a point between the tables, substantially as described.

11. In combination, a supporting frame including an upper horizontal rigid member, a hollow sleeve attached to and depending from said member, a valve casing attached to said sleeve and having a passage therethrough, a valve normally closing said passage, a rod extending upwardly from the valve into the sleeve, a handle pivotally connected at its inner end to the rod and extending outwardly through the sleeve, and being pivotally mounted between its ends on the sleeve, a spring disposed between the upper side of the inner end of the handle and the said rigid member, means for carrying compressed air to the valve casing above the valve, and a sand containing hopper adapted to be positioned under the valve casing to receive the impulse of the compressed air on lifting the valve by pulling down on said handle to force the sand from the hopper, substantially as described.

In testimony whereof I affix my signature

DONALD J. CAMPBELL